(12) United States Patent
Sharp et al.

(10) Patent No.: US 8,656,939 B2
(45) Date of Patent: Feb. 25, 2014

(54) APPARATUS, SYSTEM AND METHODS FOR SEALING AND SEVERING A SUBSEA PIPELINE

(75) Inventors: Jarred Christopher Sharp, Houston, TX (US); Scott Oren Crook, Carriere, MS (US); Jimmie Dean Adkins, San Ramon, CA (US); Daniel Christopher Kefford, Houston, TX (US); Edward Shintaro Nakajima, Sugar Land, TX (US); Jean Michael Thibodeaux, Covington, LA (US)

(73) Assignee: Chevron U.S.A. Inc., San Ramon, CA (US)

( * ) Notice: Subject to any disclaimer, the term of this patent is extended or adjusted under 35 U.S.C. 154(b) by 133 days.

(21) Appl. No.: 13/408,055

(22) Filed: Feb. 29, 2012

(65) Prior Publication Data

US 2013/0220436 A1    Aug. 29, 2013

(51) Int. Cl.
*F16L 1/26* (2006.01)

(52) U.S. Cl.
USPC .......................... 137/15.08; 137/318; 138/94

(58) Field of Classification Search
USPC ........................ 137/15.08, 317, 318; 138/94
See application file for complete search history.

(56) References Cited

U.S. PATENT DOCUMENTS

| | | | |
|---|---|---|---|
| 4,516,593 A | | 5/1985 | Muto |
| 4,768,561 A | * | 9/1988 | Hyodo et al. .............. 137/15.08 |
| 4,790,168 A | | 12/1988 | Vonthien |
| 4,911,193 A | * | 3/1990 | Smith ........................... 137/318 |
| 5,560,388 A | * | 10/1996 | Caldwell ...................... 137/318 |
| 5,666,848 A | | 9/1997 | Burns |
| 5,967,191 A | | 10/1999 | Mummolo |
| 6,131,597 A | | 10/2000 | Mendicino et al. |
| 6,135,157 A | * | 10/2000 | Conklin, III .................... 138/89 |
| 6,634,074 B2 | * | 10/2003 | Wild ................................ 138/98 |
| 7,032,429 B1 | | 4/2006 | McDougle |
| 7,351,010 B1 | | 4/2008 | Kelly |
| 2010/0005940 A1 | | 1/2010 | Clark, II et al. |
| 2010/0059987 A1 | | 3/2010 | Avery et al. |
| 2010/0212754 A1 | | 8/2010 | Ayers et al. |

FOREIGN PATENT DOCUMENTS

| | | |
|---|---|---|
| EP | 2381153 | 10/2011 |
| JP | 07233894 | 9/1995 |

* cited by examiner

*Primary Examiner* — Kevin Lee
(74) *Attorney, Agent, or Firm* — Karen R. DiDomenicis

(57) ABSTRACT

Disclosed is an apparatus for sealing and severing a subsea pipe adapted to convey fluids, e.g., hydrocarbons, and systems and methods using such apparatus. The apparatus includes a housing adapted to attach to the pipe, a piercing tool for providing an opening in the pipe at a predetermined location and a mechanism for establishing fluid communication between a source of sealant material and space within the pipe adjacent the opening in the pipe, and a cutting mechanism for cutting the pipe. Methods disclosed include piercing the pipe to form an opening, injecting sealant material through the opening into the pipe to form a fluid-tight seal, and cutting the pipe through the seal to form sealed cut ends.

15 Claims, 8 Drawing Sheets

APPARATUS, SYSTEM AND METHODS FOR SEALING AND SEVERING A SUBSEA PIPELINE

BACKGROUND

The present disclosure relates to apparatus for sealing and severing a subsea pipeline adapted to convey fluids, e.g., hydrocarbons, and systems and methods using such apparatus.

The demand for safe, environmentally friendly decommissioning of subsea oil and gas pipelines no longer in service is increasing. Significant amounts of operating capital are expended to remove such pipelines, many times within operating oil and gas production fields. A common current practice is to pull the decommissioned pipelines to the surface to be cut on deck of a surface vessel. In some cases, a pipeline to be removed cannot be lifted to the ocean surface in one piece because of congestion on the seafloor of pipelines, electrical cables, communication cables and the like. In some cases, a pipeline to be removed cannot be safely pulled to the surface in one piece because of corrosion, a particular problem in deep water. For these and other reasons, decommissioned subsea pipelines are typically cut into sections ranging from a few hundred feet to a few thousand feet in length before being lifted to the surface for removal and disposal. The cut sections are typically not sealed at the ends, and they may be left on the seafloor for various periods of time in which they can be subject to dislocation in the event of a strong currents in the area.

Subsea pipelines to be decommissioned are typically flushed and pigged prior to cutting the pipelines to remove hydrocarbons and thereby reduce the risk of hydrocarbon discharge during decommissioning and abandonment. High points and dead legs in the pipeline can trap hydrocarbons and preclude their being effectively cleaned out during this process. Physical constraints can also preclude the ability to pig some pipelines. Pipelines that have been conveying hydrocarbons with high paraffin content over time can contain build up of paraffin or wax deposits which may not be sufficiently cleaned by flushing and/or pigging. One current practice is for divers to manually cut the pipelines into sections with containment hoods covering the pipelines to contain any potential hydrocarbon release. This can be a time-consuming, expensive and dangerous process. Many pipelines are then sealed and abandoned in place and buried under the seafloor.

What is needed is a method of decommissioning subsea pipelines with reduced risk of hydrocarbon release to the environment, improved process safety and increased productivity.

SUMMARY

Methods and systems for sealing and severing a pipeline adapted to convey fluids are disclosed. Methods include the steps of piercing a pipeline having a pipeline inner diameter to provide an opening in the pipeline at a predetermined location; injecting a sealant material into the pipeline through the opening to fill a volumetric space defined by the pipeline inner diameter and thereby create a fluid-tight seal within the pipeline; and cutting the pipeline through the fluid-tight seal to form two sealed cut ends.

Apparatus for sealing and severing a pipeline are also disclosed. In some aspects, the apparatus includes a housing adapted to attach to a pipeline and a piercing tool for providing an opening in the pipeline at a predetermined location. In some aspects, the apparatus further includes a shearing ram movable between a retracted position within the housing and a protruded position for deforming and cutting the pipeline. In other aspects, the apparatus further includes a laser adapted for cutting the pipeline. In other aspects, the apparatus includes a laser adapted for piercing the pipeline. In yet other aspects, the apparatus includes an injection tool movable between a retracted position within the housing and a protruded position for establishing fluid communication between a source of sealant material and space within the pipeline in a space adjacent the opening in the pipeline.

DESCRIPTION OF THE DRAWINGS

These and other objects, features and advantages of the present invention will become better understood with regard to the following description, appended claims and accompanying drawings where:

DETAILED DESCRIPTION

Figure 1A:
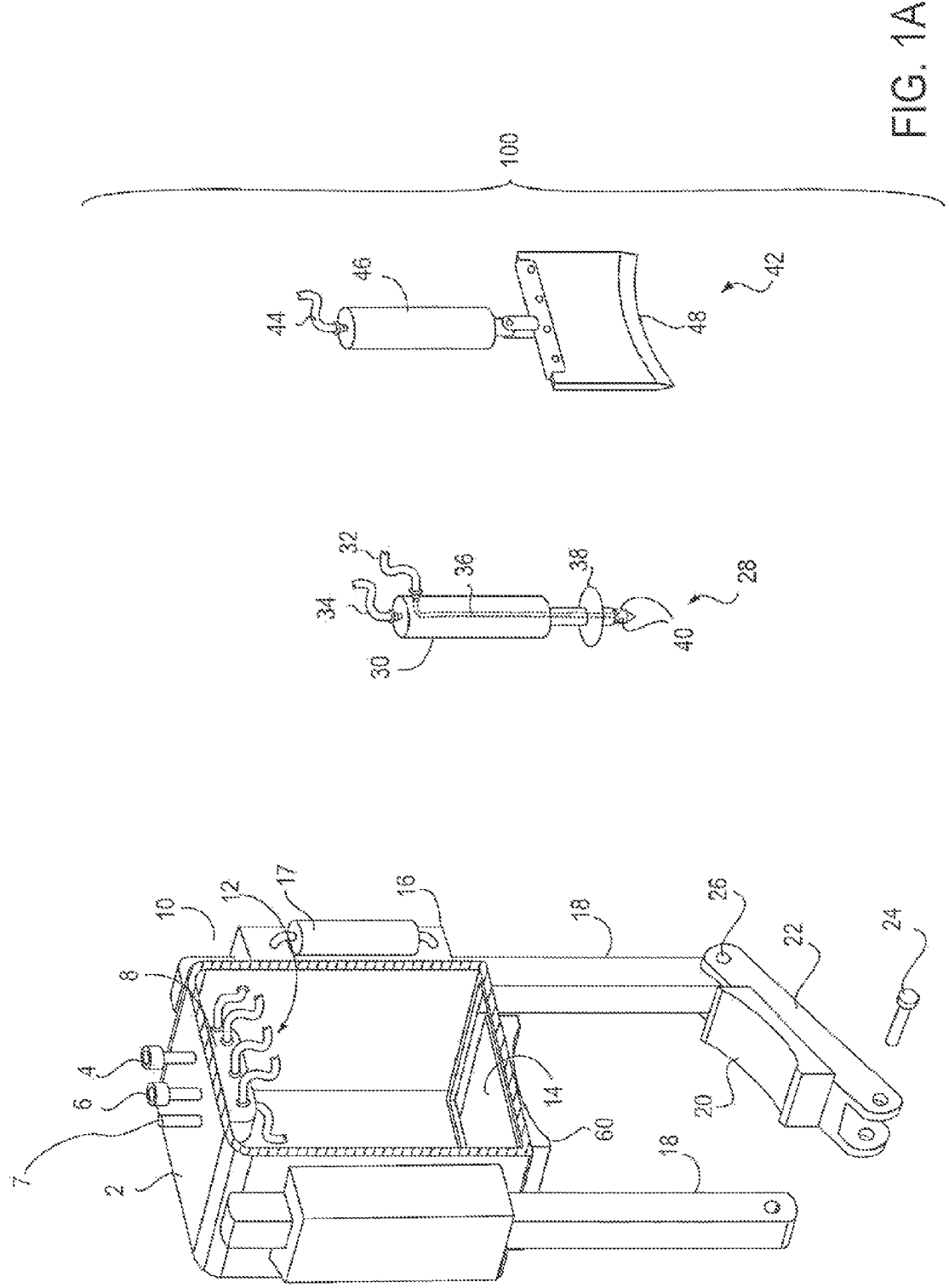
FIG. 1A is an exploded view of an apparatus for sealing and severing a pipeline according to one aspect.
Figures 1B, 1C:
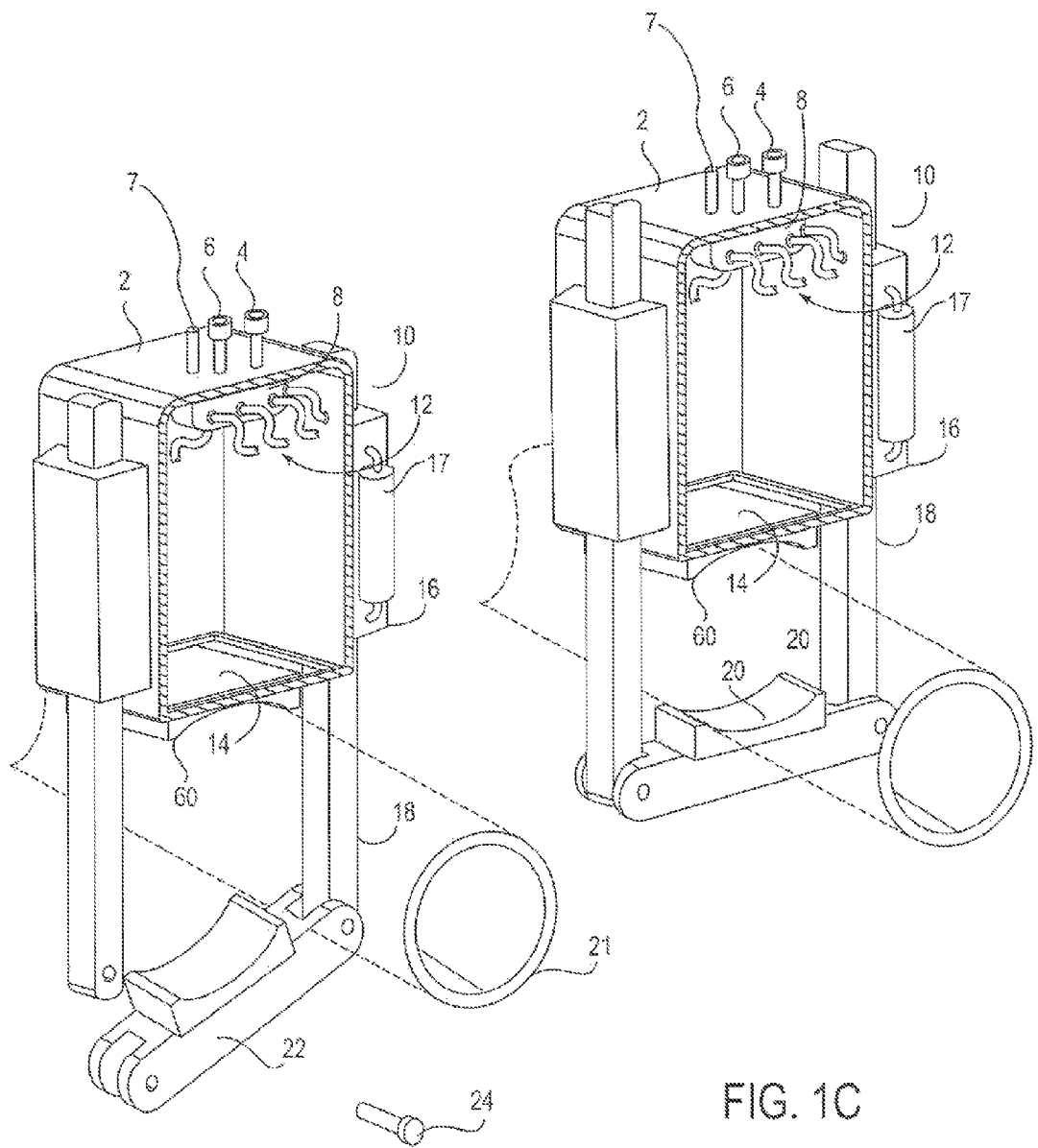
FIGS. 1B-1C are perspective views of the apparatus of FIG. 1A.

FIG. 1A is an exploded view of an apparatus 100 for sealing and severing a pipeline according to one aspect of the present disclosure. Tool body 10 is adapted to receive a section of pipe between lower pipe support 20 and upper pipe support 60. In the embodiment shown, the tool body 10 includes a housing 2 attached to a frame comprising two arms 18 and a cross member 22 between the arms 18 having the lower pipe support 20 thereon. The cross member 22 can be connected to the arms 18 by means of pins, for instance one fixed pin 26 and one removable pin 24, thus allowing cross member 22 to be opened in the manner of a gate. FIGS. 1B and 1C are perspective views of tool body 10 receiving a section of pipe 21, in which the cross member 22 is open (FIG. 1B) and closed around the section of pipe 21 (FIG. 1C), respectively. The upper pipeline support 60 is provided on the lower surface of the housing 2. The arms can optionally be raised and lowered to accommodate differing sizes of pipe, e.g., utilizing hydraulics 17 shown mounted to the housing 2 by way of mounts 16. The tool body 10 can accommodate nominal pipe diameters between approximately 3 inches (7.6 cm) and approximately 10 inches (25.4 cm).

The housing 2 can be fitted with various components as needed, including an electric cable via port 7 and hydraulic fluid via port 4. A port 6 is provided in the housing 2 through which sealant material can be delivered to the tool body 10. A junction box 8 can be mounted on or within housing 2 for receiving electricity, hydraulic fluid and sealant material, and providing outgoing fittings 12 to supply electricity, hydraulic fluid and sealant material.

Within the housing 2, various sub tools can be housed for use in the methods and systems of the present disclosure. The sub tools can be housed within housing 2 in their retracted position, and can protrude through opening 14 when they are activated. For instance, a piercing tool 28 can be provided within the housing 2. The piercing tool 28 has a piercing tool body 30, a sealing gasket 38 and a piercing tip 40. The piercing tool 28 can be controlled by hydraulics and/or electricity via connection with the junction box 8 by means of a connection fitting 34. In one embodiment, the piercing tool 28 is provided with a fitting 32 for receiving sealant material in fluid communication with sealant line 36 through which sealant material can be delivered to the piercing tip 40, and through holes within the piercing tip 40.

Additionally, a shearing tool 42 can be provided within the housing 2. The shearing tool 42 includes a connection fitting 44 by which the tool can be connected to junction box 8 to receive power and control. The shearing tool 42 also includes a shearing tool body 46 connected to a shearing ram 48. The shearing ram 48 is optionally curved to accommodate curved outer surfaces of pipe.

Figure 2A:
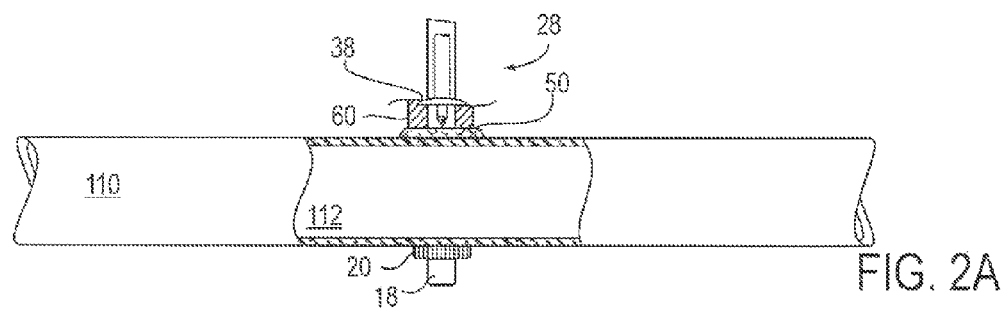
FIGS. 2A-2F are illustrations of sequential method steps for sealing and severing a pipeline according to one aspect.

FIGS. 2A-2F are illustrations of sequential method steps for sealing and severing a pipeline using the apparatus 100 according to one aspect of the present disclosure. FIG. 2A is a cross-sectional side view of the piercing tool 28 being operated by the tool body described above to pierce the section of pipe 110 held between upper pipe support 60 and lower pipe support 20. Piercable gasket 50 is placed on the surface of the pipe at the location to be pierced. The piercing tool 28 is controlled such that the piercing tip 40 pierces the gasket 50 and the pipe 110. Following piercing the pipe 110 to form an opening in the pipe, pressure within the pipe is optionally vented.

Figure 2B:
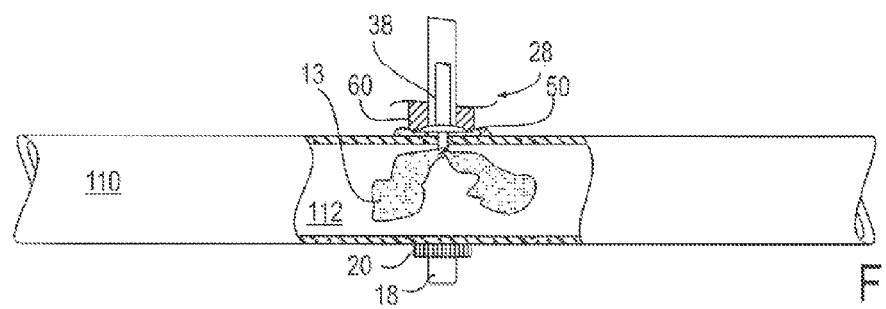
Figure 2C:
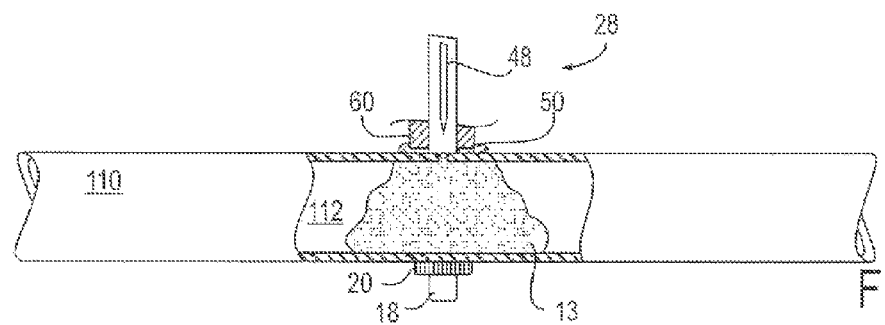

As shown in FIG. 2B, sealant material 13 is delivered through the piercing tool 28 into space 112 within pipe 110 adjacent the opening made by the piercing tool 28. Sealant material is injected into space 112 until a volumetric space defined by the pipeline inner diameter is filled, thereby creating a fluid-tight seal within the pipeline as shown in FIG. 2C. In one embodiment, the fluid-tight seal has a length in the axial direction along the pipeline of at least two pipeline inner diameters. Optionally, sufficient time is allowed for the sealant material to cure prior to cutting the pipe.

Whereas in the above description, the sealant material is delivered through the piercing tool 28, in an alternative embodiment, the sealant material can be delivered through a separate injection tool (not shown) which can also be housed within the housing 2 and which can be inserted into the opening provided by the piercing tool.

Figure 2D:
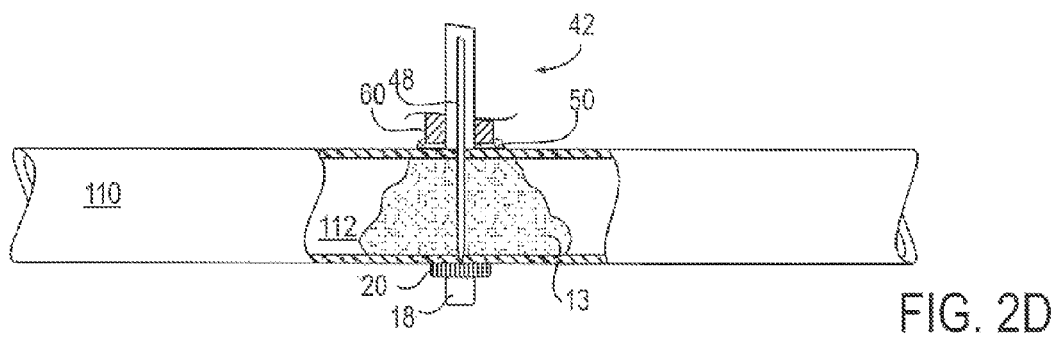
Figure 2E:
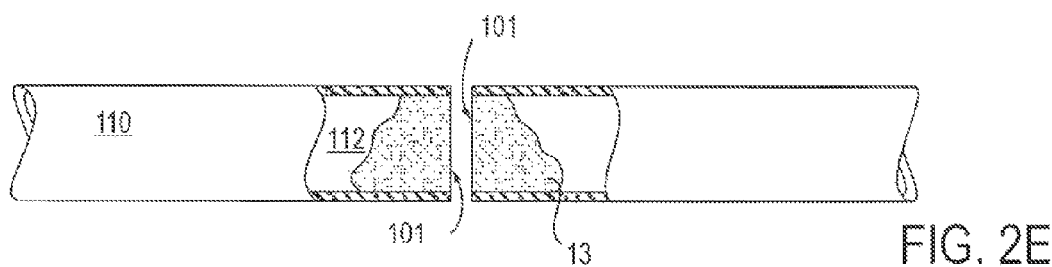
Figure 2F:
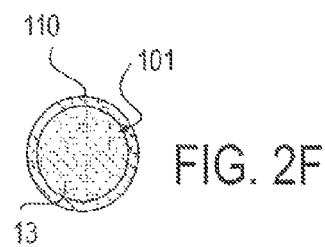

In FIG. 2D, the shearing tool 42 is operated by the tool body to shear the pipe 110 through the fluid-tight seal made up of sealant material 13. FIGS. 2E and 2F illustrate the resulting sealed cut ends 101. In this embodiment, as shown, the diameter of the pipe 110 at the cut ends 101 is substantially unchanged as a result of shearing by the shearing ram 48. By "substantially unchanged" is meant a minimum of deformation of pipe 110, for example, less than a 5% change in diameter. This can be accomplished by the use of a sharp blade, a laser, a rotating cutting wheel, and the like.

Figure 3A:
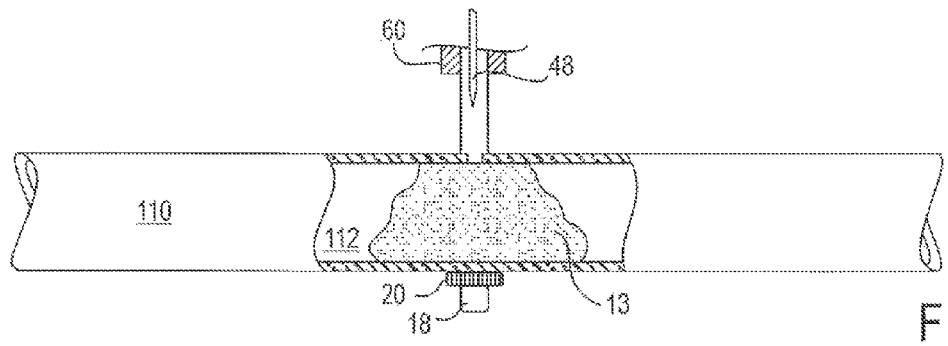
FIGS. 3A-3F are illustrations of sequential method steps for severing a pipeline according to one aspect.
Figure 3B:
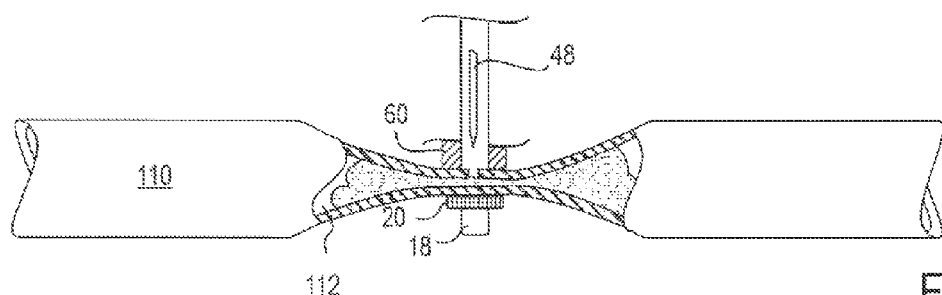
Figure 3C:
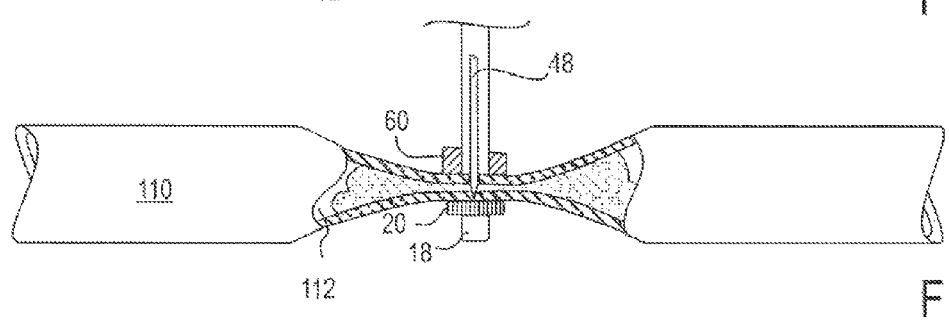
Figure 3D:
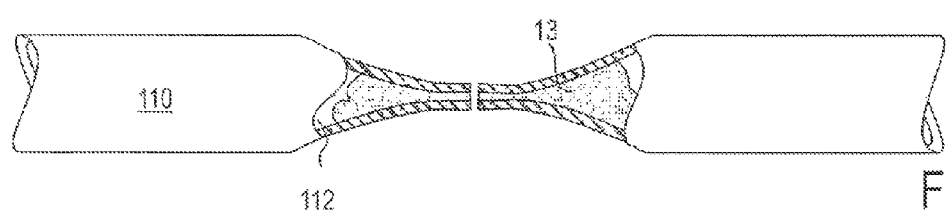
Figures 3E, 3F:
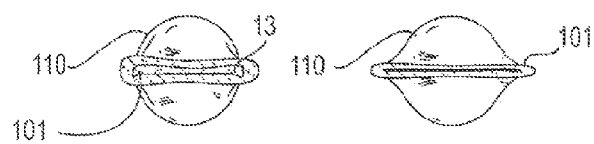

FIGS. 3A-3F are illustrations of sequential method steps for severing a pipeline according to one aspect of the present disclosure, following the formation of the fluid-tight seal of sealant material 13. As shown in FIG. 3A, section of pipe 110 is held by the tool body described above between upper pipe supports 60 and lower pipe support 20. As shown in FIG. 3B, the arm 18 of the tool body has been controlled, generally by means of hydraulics, to bring together the upper pipe support 60 and the lower pipe support 20, thereby securing and then collapsing or crushing the pipe 110 there between. As shown in FIG. 3C, the shearing tool 42 is operated such that shearing ram 48 penetrates the pipe 110 and shears the pipeline 110, as shown in FIG. 3D. FIGS. 3E and 3F illustrate alternative, generally flattened, sealed cut ends 101 of pipe 110 which may result. As shown in FIG. 3E, pipe 110 is substantially flattened, by which is meant the diameter of the pipe is deformed but not flattened. As can be seen, sealant material 13 is visible from the cut end 101, although the fluid-tight seal formed by the sealant material 13 is securely held within the cut end 101 of pipe 110. As shown in FIG. 3F, pipe 110 is flattened to the degree that no sealant material is visible from the cut end 101.

The tool body 10 and sub tools, i.e., the piercing tool 28 and the shearing tool 42, can be operated by any known, convenient means, such as, for example, manually by a diver, by a remotely operated vehicle (ROV), and by a hydraulic power unit in communication with the tool body 10.

Figure 4A:
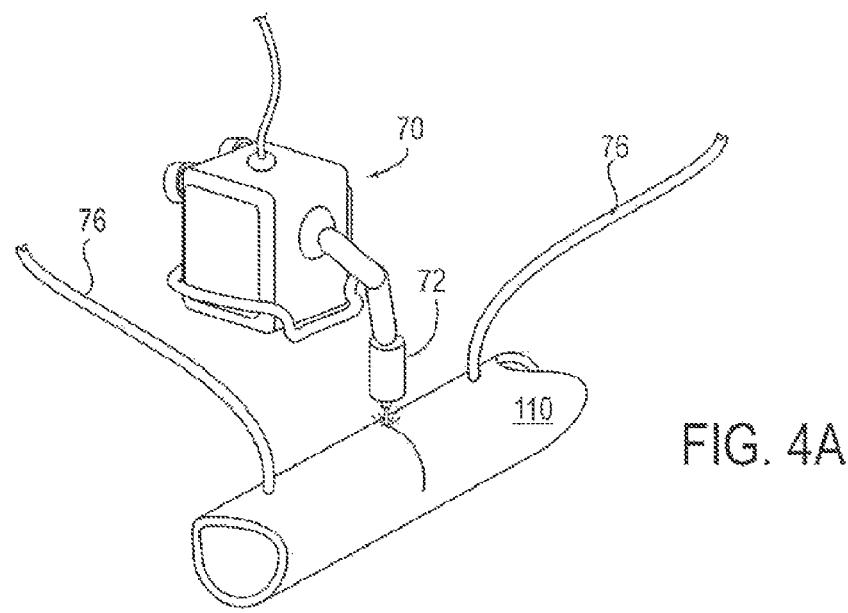
FIGS. 4A-4C are illustrations of alternative method steps for severing a pipeline.
Figure 4B:
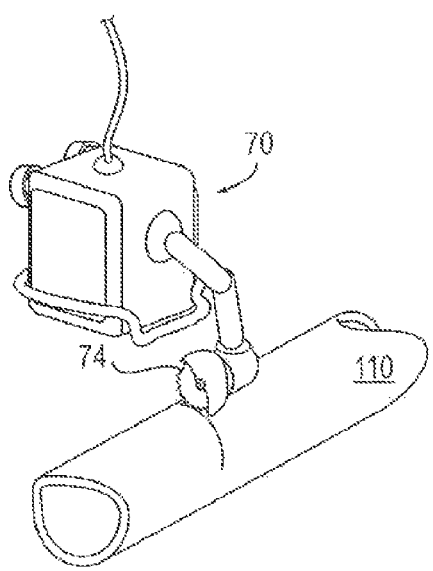
Figure 4C:
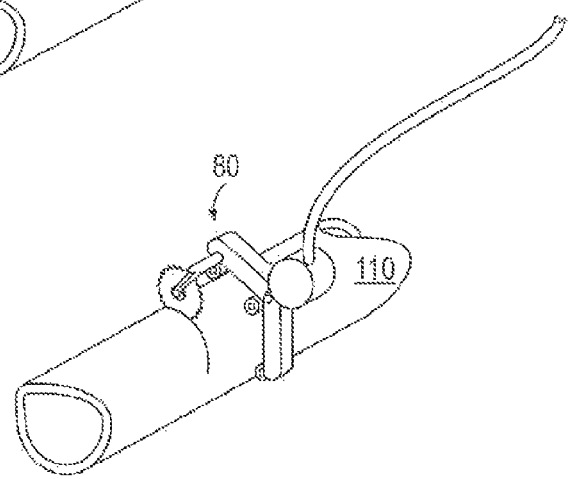

Alternative cutting mechanisms not already described can also be used to cut the pipe. FIGS. 4A-4C are illustrations of alternative method steps for severing a section of pipe 110. As shown in FIG. 4A, pipe 110 can be cut by the use of a laser or hyperbaric weld cutting tool 72 operated by an ROV 70. Vent lines 76 are provided to evacuate the pipe 110 during cutting operations. As shown in FIG. 4B, pipe 110 can be cut by the use of a rotary cutting wheel 74 operated by an ROV 70. As shown in FIG. 4C, pipe 110 can be cut by the use of a rotary cutting wheel tool 80 having rollers for guiding the tool around the circumference of the pipe. A diamond wire saw can optionally be used to make a clean cut.

Regardless of which of the methods described herein is used for cutting the pipe, sealed cut ends are formed which minimize the potential of hydrocarbon leak there through, as fluids are prevented from passing through the sealed cut ends.

Figure 5:
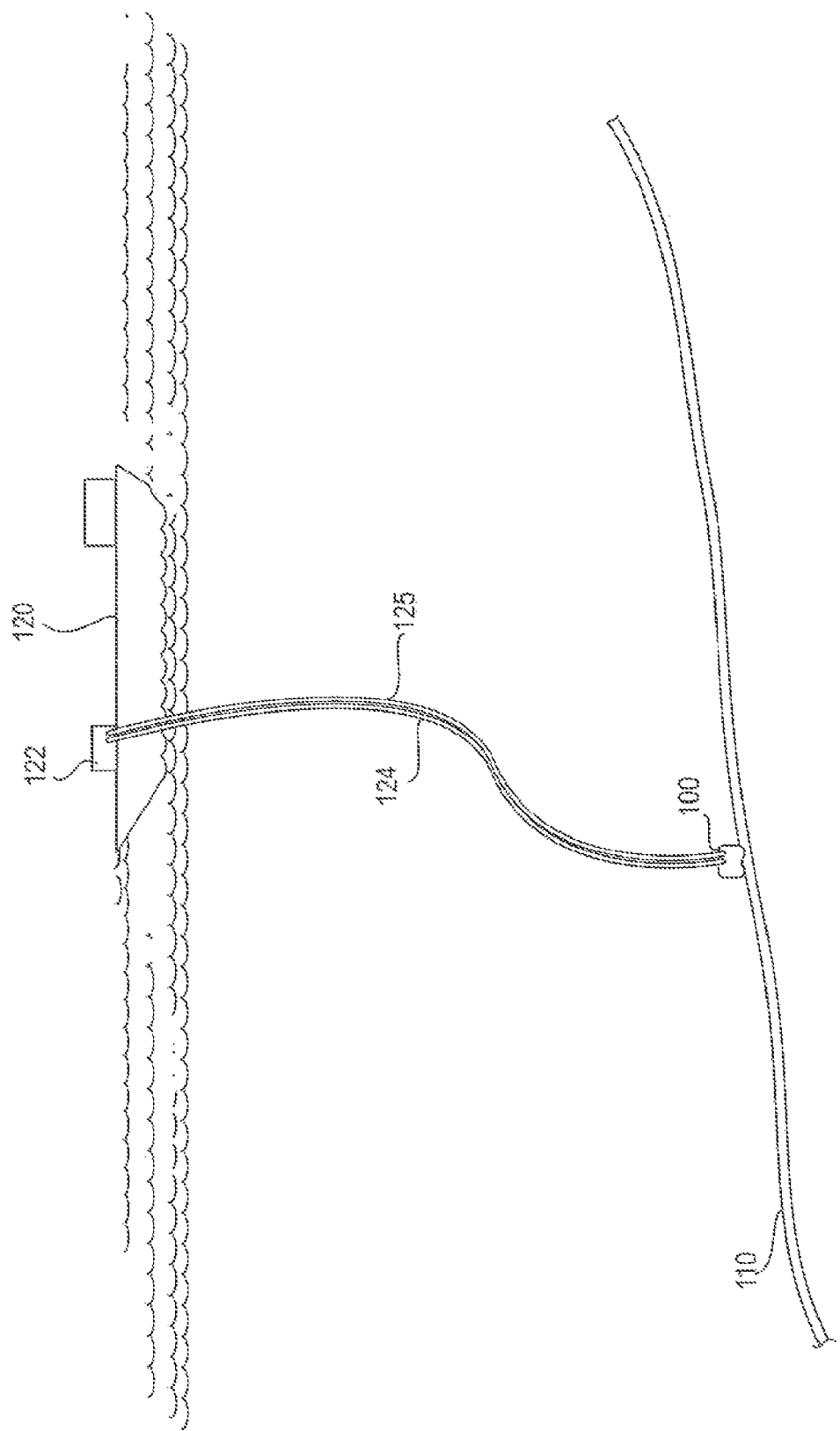
FIG. 5 illustrates a system according to one aspect.

FIG. 5 illustrates a system according to one aspect of the present disclosure, in which subsea pipe 110 is sealed and cut by apparatus 100 connected by a sealant line 124 to a source of sealant material 122 on board a floating vessel 120. Alternatively, the source of sealant material can be located on an alternative surface structure, e.g., a platform or an onshore structure (not shown). Alternatively, the source of sealant material can be located within the tool body housing 2, or in a separate subsea reservoir (not shown). In some embodiments, the system also includes a vent line 125 for venting pressure from the pipeline 110.

Sealant materials suitable for use in the systems and methods disclosed herein will be apparent to those skilled in the art. Nonlimiting examples include elastomeric sealants and polyurethane sealants, such as two component spray polyurethane foam available under the trade name FROTH-PAK™ from the Dow Chemical Co. (Midland, Mich.).

In some embodiments, a protective covering or dome over the union of the apparatus 100 and the section of pipe 110 is provided during use as redundant safety equipment to prevent the escape of hydrocarbons.

Figure 6:
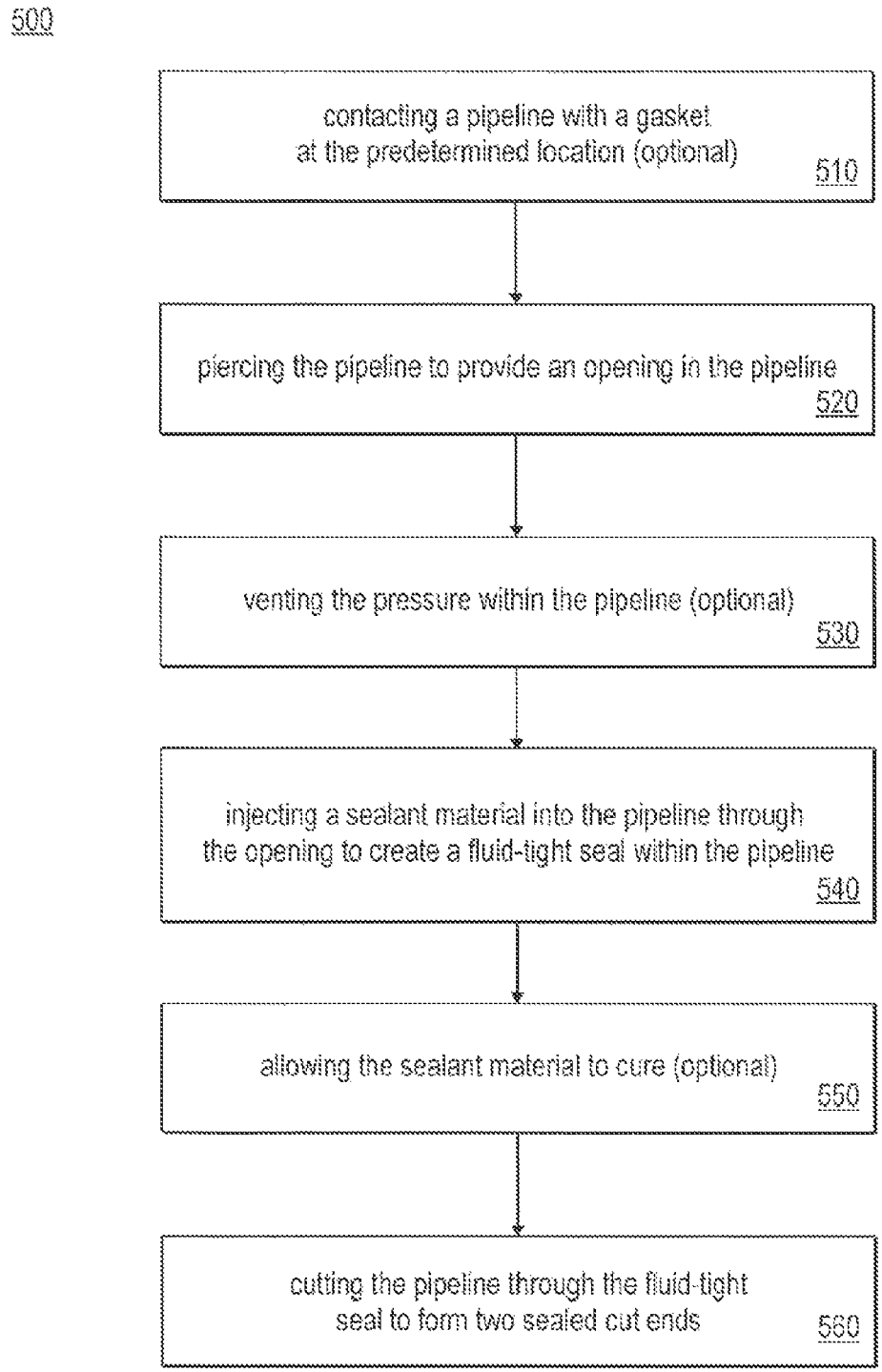
FIG. 6 is a flow chart including sequential method steps for sealing and severing a pipeline according to one aspect.

FIG. 6 is a flow chart 500 listing sequential method steps for sealing and severing a pipeline according to certain aspects previously described in the present disclosure. In optional step 510, a gasket is placed at a predetermined location for piercing the pipeline. In step 520, the pipeline is pierced to provide an opening in the pipeline. In optional step 530, the pressure within the pipeline is vented. In step 540, a sealant material is injected into the pipeline through the opening provided in step 520 to create a fluid-tight seal within the pipeline. In optional step 550, the sealant material is allowed to cure. Finally, in step 560, the pipeline is cut through the fluid-tight seal to form two sealed cut ends.

Unless otherwise specified, the recitation of a genus of elements, materials or other components, from which an individual component or mixture of components can be selected, is intended to include all possible sub-generic combinations of the listed components and mixtures thereof Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for sealing and severing a subsea pipeline adapted to convey fluids, the method comprising, in order:
    a. piercing a pipeline having a pipeline inner diameter to provide an opening in the pipeline at a predetermined location wherein the pipeline has no fluid flowing therethrough;
    b. injecting a sealant material into the pipeline through the opening to fill a volumetric space defined by the pipeline inner diameter and thereby create a fluid-tight seal within the pipeline; and
    c. cutting the pipeline through the fluid-tight seal to form two sealed cut ends.

2. The method of claim 1, wherein each sealed cut end comprises a generally flattened pipeline end containing the sealant material and wherein fluids are prevented from passing through the sealed cut end portions.

3. The method of claim 1, further comprising contacting the pipeline with a gasket at the predetermined location prior to piercing the pipeline.

4. The method of claim 1, further comprising venting pressure within the pipeline to a predetermined pressure following piercing the pipeline and prior to injecting the sealant material.

5. The method of claim 1, further comprising allowing the sealant material to cure following injecting the sealant material and prior to cutting the pipeline.

6. The method of claim 2, wherein each generally flattened pipeline end is substantially flattened.

7. The method of claim 1, wherein the diameter of each of the sealed cut ends is substantially unchanged as a result of cutting the pipeline.

8. The method of claim 1, wherein the fluid-tight seal has a length in the axial direction along the pipeline of at least two pipeline inner diameters.

9. An apparatus for sealing and severing a pipeline comprising:
    a. a housing adapted to attach to a pipeline;
    b. a piercing tool for providing an opening in the pipeline at a predetermined location;
    c. a cutting mechanism for severing the pipeline; and
    d. an injection tool movable between a retracted position within the housing and a protruded position for establishing fluid communication between a source of sealant material and space within the pipeline in a space adjacent the opening in the pipeline.

10. The apparatus of claim 9, wherein the cutting mechanism comprises a shearing ram movable between a retracted position within the housing and a protruded position for severing the pipeline.

11. The apparatus of claim 9, wherein the piercing tool is movable between a retracted position within the housing and a protruded position.

12. An apparatus for sealing and severing a pipeline comprising:
    a. a housing adapted to attach to a pipeline;
    b. a piercing tool for providing an opening in the pipeline at a predetermined location and establishing fluid communication between a source of sealant material and space within the pipeline in a space adjacent the opening in the pipeline; and
    c. a cutting mechanism for cutting the pipeline.

13. A system for sealing and severing a pipeline adapted to convey fluids, the system comprising:
    a. the apparatus according to one of claims 9 and 12; and
    b. a source of sealant material.

14. The system of claim 13, wherein the source of sealant material is contained within the housing of the apparatus.

15. The system of claim 13, wherein the source of sealant material is contained within a reservoir external to the housing of the apparatus.

* * * * *